United States Patent [19]

Elzinga

[11] 4,040,435
[45] Aug. 9, 1977

[54] FUEL CELLS AND METHODS OF OPERATING THEM

[75] Inventor: Eugene Robert Elzinga, Paris, France

[73] Assignee: Exxon Research and Engineering Company, Linden, N.J.

[21] Appl. No.: 626,472

[22] Filed: Oct. 28, 1975

[30] Foreign Application Priority Data

Nov. 18, 1974 United Kingdom .............. 49763/74

[51] Int. Cl.² ............................................ H01M 8/04
[52] U.S. Cl. ....................................... 429/14; 429/26
[58] Field of Search ........................... 136/86 R, 86 E

[56] References Cited

U.S. PATENT DOCUMENTS

| 2,901,523 | 8/1959 | Justi et al. ........................... | 136/86 R |
| 3,002,039 | 9/1961 | Bacon ................................. | 136/86 E |
| 3,287,167 | 11/1966 | Weiss et al. ......................... | 136/86 E |

Primary Examiner—John H. Mack
Assistant Examiner—H. A. Feeley
Attorney, Agent, or Firm—Joseph J. Dvorak

[57] ABSTRACT

A fuel cell wherein the electrolyte comprises a volatilizable solvent and a solute whose solubility in the solvent varies with electrolyte temperature can be operated by increasing or decreasing the amount of solvent relative to the amount of solute as the solubility of the latter in the solvent respectively decreases or increases due to variations in the temperatures of the electrolyte in the cell or cell system. A suitable fuel cell has an anode compartment supplied by a fuel and uses an electrolyte comprising an aqueous solution of at least one salt and has a cathode compartment supplied with a gas containing molecular oxygen, wherein the electrolyte is conveyed from a first container and returned to the latter after passing through said anode compartment and comprises a condenser suitable for condensing a predetermined quantity of the water vapor present in the gases emerging from the cathode compartment and a second container receiving condensed water from said condenser, this latter container communicating with said first container by means of an overflow and a valve.

9 Claims, 1 Drawing Figure

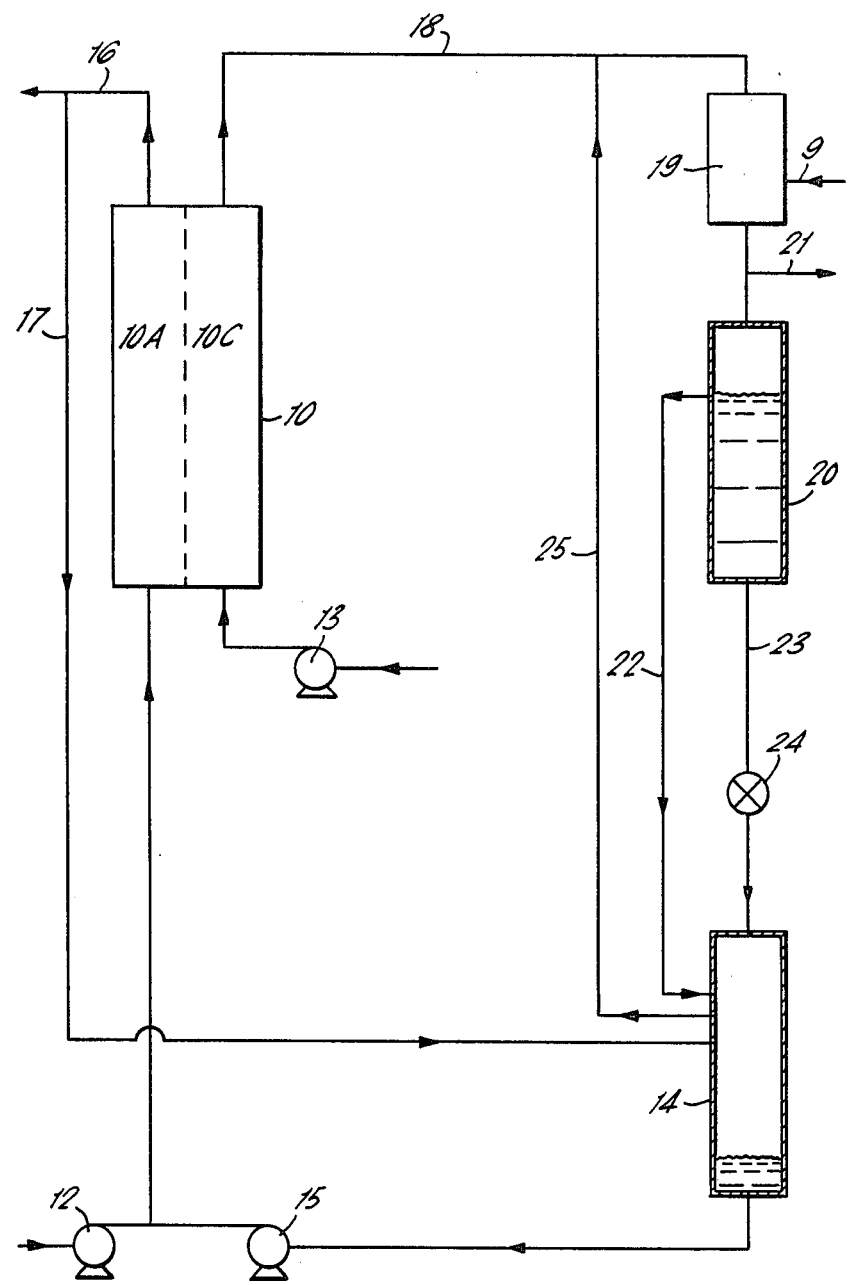

FUEL CELLS AND METHODS OF OPERATING THEM

The present invention relates to fuel cells and their operation.

The operating performance of fuel cells is generally improved by increasing the operating temperature. However, where the fuel cell has an electrolyte solution comprising a volatilizable solvent in which one or more solutes are dissolved, an upper limit to the operating temperature is set by the boiling point of the electrolyte solution. The upper temperature limit can be increased by increasing the concentration of the dissolved solute, but this usually raises the temperature at which separation of the solute from the solvent takes place. If the solute is a normally solid salt, the separation of solute and solvent will manifest itself as crystallization and will occur whenever the cell temperature is reduced below the crystallization temperature, e.g. when the fuel cell is shut down. The crystallization of the solids from the electrolyte solution causes difficulties in starting up the fuel cell and its associated equipment (the "fuel cell system"). In fuel cells which operate at temperatures exceeding ambient temperature and which employ an electrolyte solution comprising a volatilizable solvent containing dissolved solute whose solubility decreases with decreasing temperature, the shut-down of the fuel cell will cause crystallization, and the concomitant subsequent start-up difficulties. It is not usually possible and/or convenient to remove electrolyte solution so completely from a fuel cell on shut-down that such crystallization can be avoided.

The present invention provides a method of operating a fuel cell wherein the electrolyte comprises a volatilizable solvent and a solute whose solubility in the solvent varies with electrolyte temperature, the method comprising increasing or decreasing the amount of solvent relative to the amount of solute as the solubility of the latter in the solvent respectively decreases or increases due to variations in the temperature of the electrolyte in the cell or cell system.

Preferably the fuel cell is normally so operated between start-up and shut-down that at least some of the heat produced by cell operation is removed from the cell by volatilization or evaporation of the solvent.

At least some of the thus volatilized solvent is preferably condensed and recirculated to the cell to maintain the solute concentration in the cell at a selected value below the solubility limit. Preferably a constant volume reservoir for electrolyte solution is provided in the fuel cell system and the condensed solvent is mixed with electrolyte solution in the reservoir, and any excess of electrolyte solution from the reservoir is recirculated to the fuel cell thereby ensuring that the solution has a substantially constant concentration of solute in the solvent. The electrolyte solution which has been recirculated to the fuel cell is recovered and passed back to the electrolyte solution reservoir. The concentration of solute in the solvent of the recovered electrolyte solution may be different to the concentration of the solute in the solution due to, e.g. solvent evaporation losses, solute losses or conversion, or the formation of additional solvent and/or solute at the electrodes in the fuel cell. All or any such changes can be accommodated by the method of the invention.

Preferably, the condensed volatilized solvent is recovered in a solvent reservoir having an overflow level which is substantially constant so that all of the condensate received in the solvent reservoir in excess of the volume required to fill the solvent reservoir to the overflow level will be able to pass out of the solvent reservoir and is preferably directed to the electrolyte solution reservoir.

The invention is particularly useful in fuel cells in which at least one of the fuel, oxidant and reaction products is/are gaseous since the condensation and recovery of solvent therefrom is thereby facilitated.

On shut-down of the fuel cell system, condensed solvent, e.g. from the solvent reservoir, is mixed with electrolyte solution, e.g. in or from the electrolyte solution reservoir so that as the electrolyte solution cools, the concentration of solute is maintained below the solubility limit of the solute.

On start-up of the fuel cell system, the electrolyte solution is heated and evaporation of the solvent allowed to take place at such a rate that the solubility limit of the solute is not exceeded. The heat is provided until the cell reactions are substantially self-sustaining. The heat may be supplied in any convenient manner, e.g. by heating the electrolyte, or less preferably, by heating one or both of the fuel and oxidant supplied to the cell. The evaporated solvent is preferably condensed and recovered as described above.

According to the invention a fuel cell capable of operating at high temperature having an anode compartment supplied by a fuel and using an electrolyte comprising an aqueous solution of at least one salt, and having a cathode compartment supplied with a gas containing molecular oxygen, said electrolyte being conveyed from a first container and returned to the latter after passing through said anode compartment, comprises a condenser suitable for condensing a predetermined quantity of the water vapour present in the gases emerging from the cathode compartment, a second container receiving condensed water from said condenser, this latter container communicating with said first container by means of an overflow and a valve, so that on the one hand, when the cell is operating at high temperature, the water derived from the condensation of steam in said condenser flows from said second container into the first one by means of the overflow, thus keeping the salt concentration of the electrolyte sufficiently high to prevent it from boiling and that moreover during the cold starting of the cell, the contents of the second container are transferred by means of the valve into said first container, thus diluting the electrolyte so that the salt concentration remains less than the limiting concentration of crystallisation.

An embodiment of the invention, given by way of non-limitative example only, is now described with reference to the accompanying drawing which shows schematically a flow diagram of a fuel cell system in which methanol is supplied as fuel to the anode and ambient air as oxidant to the cathode.

In the drawing, the fuel cell is indicated by reference 10 having an anode compartment 10A and cathode compartment 10C. Methanol is supplied from a compartment (not shown) to the anode from line 11 by pump 12. Fresh air is supplied by blower 13 to the cell 10 and electrolyte solution from a constant level electrolyte solution reservoir 14 by pump 15. The electrolyte solution comprises $K_2CO_3$ and $KHCO_3$ dissolved in water, and passes in admixture with the methanol from line 11 into the cell 10. In the cell 10, methanol is oxidized at the anode to $H_2O$ and $CO_2$ with the production of heat and electricity. Water vapour and $CO_2$ are vented from the cell via line 16 and hot electrolyte solution emerging from the anode compartment 10A is returned to the reservoir 14 via line 17. The electrolyte solution in line 17 may contain different concentrations of water and/or $CO_2$ to the electrolyte solution from reservoir 14.

Air leaves the cathode compartment 10C via line 18 at a temperature substantially equal to the fuel cell temperature and contains water vapour substantially at the equilibrium water vapour pressure of the electrolyte solution in the cell. The evaporation of water into the air serves to maintain, at least partially, the cell temperature at a constant value. The moistened air passes through a heat exchanger 19 wherein it is cooled, e.g. by a draught of cooling air 9, with the condensation of moisture therefrom. The condensed moisture is recovered in a constant level water reservoir 20 and the air is exhausted via line 21. This latter air will generally be at 100% humidity at its exhaust temperature (which will usually be slightly above the temperature of the air entering the blower 13) so that not all of the water removed from the cell 10 in the air in line 18 is recovered. During steady state operation, at a given solute concentration and temperature of the heat exchanger 19, the amount of water loss in vent line 16 and vent line 21 may be regulated to a level corresponding to the water formed from the electrochemical reaction so that the concentration of solute in the electrolyte remains substantially constant. If the recovery of water in the reservoir 20 is insufficient to avoid the need for water make up, the amount of cooling in the heat exchanger 19 is increased.

The reservoir 20 has an overflow (e.g. a weir) such that when the reservoir 20 is full to the overflow level, all the condensate from heat exchanger 19 will pass out of the reservoir 20 via the overflow and line 22 to the electrolyte solution reservoir 14 thereby to maintain the concentration of solute therein at a substantially constant value. Since the concentration of solute in the electrolyte solution in, e.g., line 17, will be high, the electrolyte solution in line 17 may be at a higher temperature than the boiling point of water (100° C) from the line 22. If the overflow of water via line 22 from reservoir 20 is at an adequately low temperature and an adequately high flow rate, the partial pressure of water vapour in the reservoir 14 due to the high temperature of recirculated electrolyte from line 17 passing into the reservoir 14 will be controllable below 1 atmosphere and therefore water vapour will not escape from the reservoir 14. However if the overflow of water via line 22 is not at an adequately low temperature and at an adequately high flow rate, the partial pressure of water vapour in the reservoir 14 will exceed 1 atmosphere. In this latter situation, the water vapour is vented via line 25 into line 18 so that condensation may be effected in the heat exchanger 19. The amount of additional heat exchange surface required in the heat exchanger 19 to effect this condensation will, generally speaking, be small in relation to the total heat exchange area of the heat exchanger 19. Line 25 also facilitates the venting of air from the reservoir 14, although it will be appreciated that in embodiments not provided with line 25, air may be vented (e.g. during start-up) via line 22. The vented air escapes via line 21. The volume of the reservoir 20 below the overflow is connectable to the reservoir 14 via a line 23 controlled by a valve 24.

When the fuel cell 10 is to be shut down, the air flow rate provided from fan 13 is reduced to a level appropriate to the desired rate of cooling of the cell. The electrolyte solution is circulated by pump 15 at a rate which is adequately high to maintain the electrolyte solution at a substantially uniform temperature in the fuel cell system. Power for the blower 13 and pump 15 is provided from auxiliary power source (not shown) such as an electric battery. When the electrolyte solution has cooled to a predetermined temperature, determined by the volume and temperature of the water in the reservoir 20 and the volume of the electrolyte, the valve 24 is opened so that water passes from reservoir 20 via line 23 to reservoir 14. Water which is vaporized on entering the relatively hot reservoir 14 is recondensed, e.g. at heat exchanger 19 and returned to the reservoir 14. Thus although the electrolyte solution temperature falls on shut-down, the concentration of the solute is maintained below the concentration at which solute crystallization commences.

When the fuel cell 10 is to be restarted, the electrolyte solution will be dilute. The valve 24 is closed and the cell is brought up to operating temperature by an auxiliary heater (not shown). Preferably, the auxiliary heater supplies heat to the electrolyte solution which is circulated by the pump 15. Alternatively, the auxiliary heater could supply heat to the methanol fuel or the air which are circulated to the cell 10, but these expedients are less preferred. The auxiliary heater may be electrically powered or may burn methanol. When the fuel cell attains a temperature at which the cell reactions can be self-sustaining (about 50° C), the circulation of electrolyte solution, methanol and fuel are all commenced. The cell temperature will rise until the evaporation rate of water is just balanced by the rate of return of water to the electrolyte solution in reservoir 14. This will not occur until the water reservoir 20 contains water up to the overflow level. Accordingly, the operating temperature of the cell can be regulated by regulating the volume of water retained by the water reservoir 20 relative to the volume of electrolyte solution in the reservoir 14. The ratio of these volumes is so chosen that when the reservoir 20 is at its maximum water level and the solution reservoir 14 is at its operating level, the concentration of solute in the electrolyte solution does not exceed the maximum solubility of the solute. During start up, the amount of water evaporation from the cell 10 is so regulated that the solubility limit of the solute is not exceeded. Such regulation may be effected by controlling the air supply rate from the blower 13.

In a specific example of a fuel cell system of the type shown in the drawing wherein methanol is the fuel, air is the oxidant, and the $CO_2$ oxidation product is exhausted at substantially the same rate as it is formed (the sum of the partial pressures of $CO_2$, $H_2O$ and $CH_3OH$ is one atmosphere), temperature control is by water vaporization. A preferred electrolyte is an aqueous solution comprising a mixture of $K_2CO_3$ and $KHCO_3$ and preferred operating conditions include the provision of twice the stoichiometric air requirement and a cell temperature of 90° C. For these conditions, it has been found that the salts concentration in terms of $K^+$ ions must be 7.2 g.mols/litre to reduce the water vapour pressure to the desired level, and that 51% of the potassium salts must be in the bicarbonate form to furnish the desired $CO_2$ partial pressure at the operating temperature. The salt(s) crystallization temperature of such a solution is 68° C. If the minimum temperature to which the sytem will be exposed during shut-down is 20° C, the K+ ion concentration must be reduced by a factor of 2.2 (from solubility determinations) if crystallization is to be avoided at shut-down. Therefore, for each unit volume of concentrated electrolyte solution at the operating temperature, there must be provided in the water reservoir 20 1.2 volumes (or more) of water below the overflow level and 2.2 volumes (or more) of capacity in the electrolyte solution reservoir to accommodate the electrolyte solution at the lowest expected shut-down temperature.

The invention can be used in any fuel cell system wherein there is a risk of separation of solute and solvent from the electrolyte solution with changes in temperature, but is of particular utility in aqueous buffered electrolyte systems containing bicarbonate solutes since in these, the solutes have a low solubility relative to the corresponding carbonate. The invention can be applied to fuel cells employing other fuels and oxidants but is of particular utility in fuel cells which consume carbon-containing fuels and/or air since in these situations, the $CO_2$ produced (or induced with the air) preferably is disposed of from the system when an auto-decarbonating buffer electrolyte solution is employed. For example, hydrogen obtained from steam reforming of hydrocarbons may contain some $CO_2$ if processing to remove the latter is not completely successful, and an auto-decarbonating electrolyte solution would be preferred in the use of hydrogen thus obtained.

What is claimed is:

1. A method of operating a fuel cell of the type which employs an electrolyte having a solvent and a solute dissolved therein so as to permit increase in electrolyte temperature during start-up of said cell and so as to avoid crystallization of said solute when electrolyte temperature is decreased during shut-down of said cell comprising: allowing the solvent in said electrolyte to evaporate during start-up of said cell, thereby increasing the concentration of solute in said electrolyte, whereby said electrolyte can be heated to higher temperatures; condensing a predetermined portion of the evaporated solvent; maintaining the concentration of solute in said electrolyte below the solubility limit of said solute in said solvent; returning said condensed solvent to said electrolyte during shut-down of said cell whereby crystallization of said solute in said solvent is avoided.

2. A method according to claim 1 wherein the fuel cell is operated so that between start-up and shut-down of the cell at least some of the heat produced by cell operation is removed from the cell by evaporation of the solvent from the electrolyte.

3. A method according to claim 2 wherein at least some of the evaporated solvent is condensed and recirculated to the cell to maintain the solute concentration in the cell below the solubility limit.

4. A method according to claim 3 wherein the condensed solvent is mixed with electrolyte solution housed in a constant volume reservoir and any excess of electrolyte solution from the reservoir is recirculated to the fuel cell.

5. A method according to claim 3 wherein the condensed solvent is collected in a solvent reservoir having an overflow level which is substantially constant.

6. A method according to claim 5 wherein that amount of condensate received in the solvent reservoir in excess of the overflow level passes out of the solvent reservoir to the electrolyte solution reservoir.

7. A method of claim 1 wherein the solvent in said electrolyte is water and the solute is $K_2CO_3$ and $KHCO_3$.

8. In a fuel cell having an anode compartment, a cathode compartment and an aqueous electrolyte, and including means for supplying oxidant to the cathode compartment and fuel to the anode compartment and for circulating electrolyte through said cell, the improvement comprising: heat exchanger means communicating with said cathode compartment whereby the vapor discharged from said cell is condensed; an electrolyte reservoir communicating with said anode compartment whereby electrolyte can be circulated through said cell and returned to said reservoir; a constant level reservoir communicating with said heat exchanger means; pipe means communicating between said constant level reservoir and said electrolyte reservoir, whereby water in excess of that to maintain a constant level will be discharged from said constant level reservoir to said electrolyte reservoir to be mixed therein; and valve means communicating between said constant level reservoir and said electrolyte reservoir whereby the entire contents of said constant level reservoir can be discharged into said electrolyte reservoir.

9. A fuel cell according to claim 8 which has an auxiliary heater capable of heating the electrolyte or fuel to the cell when starting the cell from cold.

* * * * *